(12) United States Patent
Vivier

(10) Patent No.: US 10,493,728 B2
(45) Date of Patent: Dec. 3, 2019

(54) METHOD FOR SUPPLYING AN ELECTRONIC COMPONENT OF A LAMINATED GLAZING UNIT WITH ELECTRICAL POWER AND LAMINATED GLAZING UNIT FOR IMPLEMENTING SAID METHOD

(71) Applicant: AGC GLASS EUROPE, Louvain-la-Neuve (BE)

(72) Inventor: Jonathan Vivier, Beuzet (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 70 days.

(21) Appl. No.: 15/578,390

(22) PCT Filed: May 17, 2016

(86) PCT No.: PCT/EP2016/060973
§ 371 (c)(1),
(2) Date: Nov. 30, 2017

(87) PCT Pub. No.: WO2016/192968
PCT Pub. Date: Dec. 8, 2016

(65) Prior Publication Data
US 2018/0215126 A1    Aug. 2, 2018

(30) Foreign Application Priority Data

Jun. 1, 2015   (EP) .................................... 15170141

(51) Int. Cl.
*B32B 17/10* (2006.01)

(52) U.S. Cl.
CPC .. *B32B 17/10541* (2013.01); *B32B 17/10036* (2013.01); *B32B 17/10192* (2013.01);
(Continued)

(58) Field of Classification Search
CPC ........ B32B 17/10036; B32B 17/10192; B32B 17/10211; B32B 17/1022;
(Continued)

(56) References Cited

U.S. PATENT DOCUMENTS 5,336,965 A *  8/1994  Meyer .................... B32B 17/10
                                                       313/498
5,408,353 A *  4/1995  Nichols ............. B32B 17/10036
                                                       359/260
(Continued)

FOREIGN PATENT DOCUMENTS

EP           1970195 A1    9/2008
EP           2197245 A1    6/2010
(Continued)

OTHER PUBLICATIONS

International Search Report dated Jul. 26, 2016, in PCT/EP2016/060973, filed May 17, 2016.

*Primary Examiner* — Stephen W Smoot
(74) *Attorney, Agent, or Firm* — Oblon, McClelland, Maier & Neustadt, L.L.P.

(57) ABSTRACT

A method for supplying an electronic component of a laminated glazing unit with electrical power, the laminated glazing unit including at least two superposed glass sheets with, interposed, at least one thermoplastic interlayer, the electronic component being housed between the two glass sheets. The electronic component is connected to an electrical current source by an electrically conductive circuit that is housed between the glass sheets. Duration of activation of the electrical current source is controlled by a microcontroller.

20 Claims, 1 Drawing Sheet

(52) U.S. Cl.
CPC .. *B32B 17/10211* (2013.01); *B32B 17/10761* (2013.01); *B32B 17/10779* (2013.01); *B32B 17/10788* (2013.01); *B32B 2457/12* (2013.01)

(58) Field of Classification Search
CPC ........ B32B 17/10495; B32B 17/10541; B32B 17/10761; B32B 17/10779; B32B 17/10788; B32B 2457/12
See application file for complete search history.

(56) References Cited

U.S. PATENT DOCUMENTS

| | | | |
|---|---|---|---|
| 5,624,591 | A | 4/1997 | Di Trapani |
| 5,654,736 | A * | 8/1997 | Green ................... G02F 1/163 345/105 |
| 2005/0162355 | A1 | 7/2005 | Yamazaki |
| 2006/0275599 | A1 | 12/2006 | Lefevre |
| 2007/0178314 | A1 | 8/2007 | Marumoto |
| 2010/0171437 | A1 * | 7/2010 | Van Herpen ...... B32B 17/10036 315/250 |
| 2010/0179725 | A1 * | 7/2010 | Boote ................... B32B 17/10 701/36 |
| 2018/0370195 | A1 * | 12/2018 | LaLuet ............. B32B 17/10045 |

FOREIGN PATENT DOCUMENTS

| | | |
|---|---|---|
| FR | 2705856 A1 | 12/1994 |
| FR | 2724525 A1 | 3/1996 |
| WO | 2004/062908 A2 | 7/2004 |

* cited by examiner

METHOD FOR SUPPLYING AN ELECTRONIC COMPONENT OF A LAMINATED GLAZING UNIT WITH ELECTRICAL POWER AND LAMINATED GLAZING UNIT FOR IMPLEMENTING SAID METHOD

The invention relates to laminated glazing, especially to laminated glazing incorporating electronic components.

The invention relates more particularly to a method for supplying electrical power to an electronic component of such laminated glazing, and a laminated glazing that is specially adapted to implement this method.

Laminated glazing is commonly used in the automobile industry to manufacture windshields of motor vehicles and in the building industry to manufacture in particular safety glazing, atrium windows and guards for balcony or flat roofs.

Laminated glazing units are composite laminated assemblies. They normally comprise to superposed glass sheets, between which a thermoplastic interlayer is inserted. The thermoplastic interlayer is an adhesive film whose function is to secure the two glass sheets together. Polyvinylbutyral (PVB) or a copolymer of ethylene and vinylacetate (EVA) is commonly used, although other adhesive materials may be suitable.

The document WO 2004/062908 (GLAVERBEL) discloses laminated glazing in which electronic components have been incorporated, together with an electrically conductive circuit for connecting said electronic components to a source of electric current.

The electronic components (for example light-emitting diodes) and the electrically conductive circuit are housed between the glass sheets or between one of said sheets and the thermoplastic interlayer.

It has been observed that, in certain conditions of use, these known glazing units undergo an ageing that is characterized by gradual corrosion of the electrically conductive circuit. This corrosion impacts the esthetic quality by forming a brownish color, but also impacts the electrical properties of the electrically conductive circuit. Thus, when these glazings are powered, they can reach a temperature of 85° C., this corrosion can then appear early and after only 3 days.

It has now been found that the corrosion of the abovementioned known glazing units can be slowed down considerably, or even eradicated, by means of an appropriate selection of the electrical power supply for their electronic components.

Consequently, the invention aims to provide a novel and original method for supplying electrical power to the electronic components of the known glazing units described above, this method avoiding corrosion of the electrically conductive circuit of the glazing, during its use.

Hence, an objective of the invention is also to provide a method for supplying electrical power to the electronic components of the laminated glazing which slows down or even eradicates the ageing of these glazing units.

Another objective of the invention is to provide a novel glazing, which is specially suited to implementing the abovementioned method.

An additional objective of the invention is to provide an installation comprising, on the one hand, laminated glazing incorporating an electronic component and, on the other hand, a source of electric current linked to said electronic component, said installation being designed to slow down, or even eradicate, the above-defined ageing of the glazing.

Consequently, the subject of the invention is a method for supplying electrical power to an electronic component of laminated glazing, said laminated glazing comprising at least two superposed sheets of glass with at least one thermoplastic interlayer inserted between them and the electronic component being housed between the two glass sheets, whereby the electronic component is linked to a source of electric current by an electrically conductive circuit, which is housed between the glass sheets; according to the invention, the method is characterized in that the source of electric current is controlled timewise by a microcontroller.

The laminated glazing used in the method according to the invention is of the type commonly used in technical applications, defined above. It comprises, generally, at least one pair of glass sheets, between which an interlayer made of thermoplastic material is sandwiched. The dimensions and the shape of the glazing are not critical to the definition of the invention. The glazing can equally well be flat or dished or have any shape compatible with its destination.

According to the applications sought, sheets of plane, colored, matt, sandblasted, screenprinted glass or any other appropriate glass type can immaterially be used.

The function of the thermoplastic interlayer is to join together the two glass sheets. It generally comprises a film made of polyester, the latter being able advantageously to be selected from polyvinylbutyral (PVB), the copolymers of ethylene and vinylacetate (EVA) and polyethyleneterephthalate (PET). The interlayer can comprise a single film made of polyester. As a variant, the interlayer can comprise a stack of several films made of polyester of the type described hereinabove. The thickness of the thermoplastic interlayer is not critical to the definition of the invention. The optimum thickness must be determined in each particular case by those skilled in the art according to various parameters, notably the dimensions of the glazing, its destination and the composition of said interlayer. The thickness of the thermoplastic interlayer is generally less than 3.5 mm, but this dimension is, however, given purely as an example and is non-limiting as to the scope of the invention.

As a variant, the glazing can comprise more than two superposed glass sheets, alternating with thermoplastic interlayers.

The function of the electronic component is to give the glazing one or more particular functionalities. It should normally have dimensions that make it possible to insert it between the glass sheets, without adversely affecting the properties of the glazing. The most appropriate selection of the dimensions of the electronic component must be determined in each particular case by those skilled in the art, according to various parameters, notably the shape, the dimensions and the constitution of the glazing, and its destination. In practice, the electronic component generally has a very small thickness, usually less than 3 mm, for example between 0.1 and 1.2 mm. These electronic component dimensions are, however, given purely as an example and are not limiting as to the scope of the invention.

The selection of the electronic component will depend on the functionality sought. Optoelectronic components such as, in particular, light-emitting diodes (LED), photoresistors, photodiodes and vision sensors, for example of CCD type (CCD standing for charge coupled device) and CMOS type (CMOS standing for complementary metal oxide semiconductor) are particularly useful because they are directly in keeping with the optical aspect of the glazing. However, other electronic components can also be inserted in order to produce complete electronic circuits. Depending on the type of components and the electrical conductors used, these circuits may or may not be visible.

The glazing used in the invention can comprise a single electronic component. It can, however, also comprise several electronic components, which is the most frequent case.

When the glazing contains several electronic components, these can all be identical. As a variant, the glazing can include a plurality of different electronic components, exercising different functionalities.

Hereinafter in this document, the expression "electronic component" designates an individual electronic component or, globally, a set of several electronic components.

Generally, the invention relates to all types of electronic components inserted into laminated glass, notably the circuits for formatting and amplifying the signals obtained from the electromagnetic antennas integrated into these same glazing units, and the lighting control circuits and sensors detailed hereinabove.

The electronic component of the glazing needs to be able to be powered with electric current, to exercise its functionality. To this end, the glazing includes, in a manner known per se, an electrically conductive circuit, housed between the two glass sheets or between a glass sheet and the thermoplastic interlayer. To this end, the electrically conductive circuit can comprise wires, strips or one or more layers of an electrically conductive material, linking the electronic component to the source of electric current. It should normally have dimensions that allow it to be inserted between the glass sheets, without adversely affecting the properties of the glazing. Typical conductive layers have a thickness generally of between 0.02 and 1 µm, preferably between 0.02 and 0.5 µm, and even more preferably between 0.2 and 0.4 µm and a surface resistance of between 0 and 80 n/square, preferably between 4 and 50 Ω/square, and even more preferably between 4 and 20 Ω/square. Depending on the applications sought, the electrically conductive circuit can or should be visible, invisible, transparent, translucent or opaque.

In a first embodiment of the invention, the electrically conductive circuit comprises a network of conductive wires laminated in the thermoplastic material of the interlayer or deposited by screenprinting on the internal face of a laminated glass sheet.

In a second embodiment of the invention, the electrically conductive circuit comprises a transparent electrically conductive layer covering a glass sheet at the interface of the latter with the thermoplastic interlayer. In this variant of the invention, electrically conductive tracks or strips may have been cut in this conductive layer by the action of a laser ray which burns the layer over a small width, thus producing non-conductive grooves that delimit the tracks in the remainder of the layer. The non-conductive grooves generally have a width of between 0.01 and 3 mm, preferably between 0.05 and 1.5 mm, and even more preferably between 0.1 and 0.8 mm. In this way, electrical connections can be obtained that are almost invisible, even if the conductive layer has a slight coloring.

In this second embodiment of the invention, the electrically conductive circuit comprises an electrically conductive layer that has been deposited on one of the glass sheets. Two distinct industrial processes can be used to deposit this electrically conductive layer.

In a first process, the electrically conductive layer comprises a pyrolytic layer, deposited on the surface of the glass at temperatures ranging from 500 to 750° C. Preferably, the conductive pyrolytic layer is deposited at temperatures of 570 to 660° C. A layer of this type can be deposited directly on the ribbon of hot glass, on leaving the step in which the molten glass floats to the surface of a bath of liquid metallic tin, in the well known float glass manufacturing method. The deposition can be made by spraying fine drops of liquid or by chemical vapor deposition. Advantageously, the pyrolytic layer is a chemically vapor deposited layer. The pyrolytic layer is made up of at least one electrically conductive oxide. Generally, the electrical conductivity is produced by the presence of a small proportion of doping elements in the layer of oxide(s). Such pyrolytic layers comprise, for example, zinc oxide doped with indium or aluminum, tin oxide doped with fluorine or antimony or indium oxide doped with tin (the latter being generally known by the abbreviation ITO). The pyrolytic process is very suitable for forming a layer of tin dioxide doped with fluorine and/or antimony.

In a second process, the electrically conductive layer is obtained by cathodic magnetron spraying in a vacuum (better known as "magnetron sputtering"). This electrically conductive layer can, for example, be a delicate layer consisting of a stack of the following individual layers: $TiO_2/ZnO/Ag/Ti/ZnO/SnO_2$.

The surface resistance of these delicate layers is generally from 1 to 20 Ω/square and, preferably from 1 to 10 Ω/square. A surface resistance value of 5 Ω/square has given excellent results.

The magnetron conductive layer can also consist of a stack which comprises an electrically conductive layer of aluminum-doped zinc or even a layer of tin-doped indium ("ITO" layer). The surface resistance of these layers is approximately 4 to 50 Ω/square and preferably approximately 4 to 15 Ω/square.

The pyrolytic layers are generally preferred to the magnetron layers, because of their greater mechanical scratch resistance.

Additional information concerning the laminated glazing used in the method according to the invention can be found in the document WO 2004/062908 (GLAVERBEL).

According to the invention, the electrical power supply for the electronic component is provided by means of an electric current source controlled by a microcontroller.

The electrical specifications of the current source will depend on the electronic component and must be determined by those skilled in the art in each particular case. Generally, in the case of light-emitting diodes (LED), it is recommended to use a current source with a peak voltage situated between 1 and 5 V, ideally between 2 and 4 V.

The electric current source makes it possible to supply the electronic component in forward voltage when the latter is switched on, and in reverse voltage when the electronic component is switched off.

The microcontroller associated with this electric current source makes it possible to measure how long the electronic component remains switched on. When the electronic component is switched off, the microcontroller activates the current source in reverse bias mode for the same amount of time as that of the positive bias mode.

At the temperature of 85° C., the temperature reached for example when a certain type of electronic component is activated, to avoid the irreversible corruption of the glazing, it is recommended to limit the time of activation in positive bias mode to 36 h, and preferably to 12 h. For the use of glazings at temperatures lower than 85° C., the activation time in positive bias mode will be able to increase considerably. The activation time will naturally be able to be adapted to the type of electronic component and to the desired maximum temperature.

The method according to the invention is applicable advantageously to glazing in which the electrically conductive circuit contains a metallic oxide (especially tin dioxide) and in which the thermoplastic interlayer contains metallic ions, especially ions of alkaline metals and/or of alkaline earth metals. By supplying such glazing from a direct current source, a gradual corrosion of the electrically conductive circuit is observed, in the vicinity of the electronic components, this corrosion being manifested by a brownish coloration of the electrically conductive circuit. This corrosion is all the faster when the temperature of the glazing is high. This corrosion has not been observed in the case where the current source is, in accordance with the invention, an electric current source controlled by a microcontroller.

The method according to the invention is therefore most particularly applicable to laminated glazing in which the electrically conductive circuit contains tin dioxide and the thermoplastic interlayer contains ions of at least one metal selected from sodium, potassium, lithium, calcium and magnesium. In this embodiment of the invention, it is possible to use tin dioxide which has been doped with fluorine and/or antimony, to make it conductive to electricity, or an electrically conductive mixture of tin dioxide and indium.

As a variant, it is also possible to use for the electrically conductive circuit a stack of layers, of which at least one is conductive to electricity. In this variant of the invention, the stack of layers can, for example, comprise a layer of a metal that is a good conductor of electricity (advantageously silver). A stack of layers $TiO_2/ZnO/Ag/Ti/ZnO/SnO_2$ is very suitable.

The invention also relates to a glazing comprising, on the one hand, two superposed glass sheets with a thermoplastic interlayer inserted between them and, on the other hand, at least two diodes that are housed between the glass sheets and that are connected to an electrically conductive circuit, also housed between the two glass sheets, the glazing being characterized in that the two diodes are connected in parallel, in the head-to-tail position, to the electrically conductive circuit.

In the glazing according to the invention, the expression "in the head-to-tail position" means that the connection of the two diodes to the terminals of the current source is arranged so that one and the same terminal of the current source is connected to the anode of one of the diodes and to the cathode of the other diode. The result of this electrical connection is that the two diodes lets the current through alternately.

In the glazing according to the invention, the electronic component is advantageously chosen such that the latter incorporates these 2 diodes, the first is the light diode and the second is the protection diode.

The method and the glazing according to the invention have various industrial applications, notably in the building industry for the private or professional sector, in the automobile industry, in the shipbuilding industry, in the rail industry and in the aeronautical industry (this nonexhaustive list is exemplary).

The method and the glazing according to the invention can be applied immaterially to glazing used for internal or external partitions in public or private buildings or vehicles, or also to decorative glazing arranged inside or outside buildings or vehicles.

Hence, the invention also relates to an installation comprising laminated glazing incorporating an electronic component linked to a source of electric current, said laminated glazing comprising two superposed glass sheets with a thermoplastic interlayer inserted between them and the electronic component being housed between the two glass sheets and being linked to the source of electric current via an electrically conductive circuit, which is housed between the two glass sheets; according to the invention, the installation is characterized by the source of electric current which is controlled by a microcontroller.

The installation according to the invention comprises, for example, a public or private building for which the glazing is fitted in a window or used as an internal partition or as a decorative partition. The installation according to the invention can also comprise a land, sea or air motor vehicle in which the glazing constitutes a window or a porthole giving an external view or an internal partition, possibly decorative.

The laminated glazing of the installation according to the invention is generally of the type of those described in the document WO 2004/062908 (GLAVERBEL).

In one particular embodiment of the installation according to the invention, the laminated glazing of said installation is a glazing according to the invention, defined above.

The installation according to the invention can comprise a single glazing. As a variant, the installation according to the invention can comprise several identical or different laminated glazing units, incorporating electronic components. In the case where the installation according to the invention comprises several laminated glazing units each incorporating electronic components, the installation can comprise a single electric current source connected to all the glazing units or several electric current sources that are each connected to a separate glazing unit.

Particular features and details of the invention will emerge from the following description of the appended figures, which represent a few particular embodiments of the invention.

FIG. 1 diagrammatically shows a particular embodiment of the installation according to the invention;

In these figures, the same reference numbers designate the same items.

Figure 1:
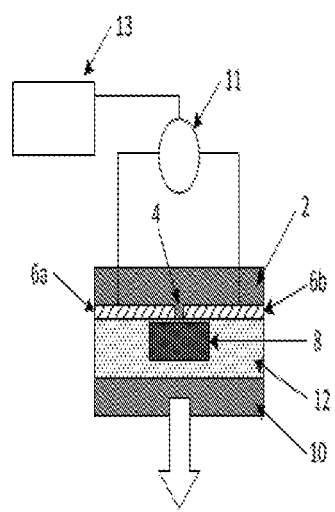

The installation diagrammatically represented in FIG. 1 comprises laminated glazing which has been deposited on a sheet 2 of produced as follows. An electrically conductive layer 6 (conductivity of approximately 2 Ω/square) has been deposited on a sheet 2 of clear soda-lime glass 2.1 mm thick, intended to be the outer glass sheet of the glazing. The conductive layer 6 is eliminated by laser over thin strips or grooves 4 approximately 0.15 mm wide, so as to delimit conductive tracks 6a, 6b. The electronic component, which in this case is an LED, is glued either side of a thin strip 4 with a conductive glue, such that its electrodes are in electrical contact with the electrically conductive strips 6a and 6b. Typical conductive glues are, for example, glues with silver.

The glass sheet 2 is then laminated, coated face innermost, with a second sheet 10 of clear soda-lime glass in the conventional manner, by inserting between them a double thermoplastic sheet 12.

The glue used to secure the LEDs 8 to the strips 6a and 6b must be chosen for its resistance to the high temperatures and pressure needed to produce the laminated glazing. It must also be chosen according to its viscosity so as to avoid it spreading into the insulating strip 4 during the lamination process.

The electrically conductive strips 6a and 6b are connected to a source of electric current 11 which, in accordance with the invention, is controlled by a microcontroller 13.

The light flux emitted by the LEDs 8 is indicated by the arrow. It is oriented toward the inner glass sheet 10 of the glazing.

Figure 2:
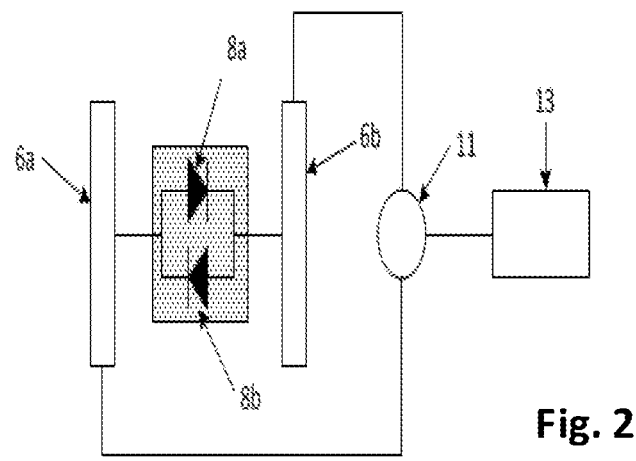
FIG. 2 is a diagram of a detail of a glazing according to the invention.

In the glazing of FIG. 2, the glazing comprises an LED consisting of 2 diodes 8a and 8b which are connected in parallel to the two electrically conductive strips 6a and 6b. According to the invention, the two diodes 8a and 8b are positioned head-to-tail inside the LED 8, so that the anode of the diode 8a and the cathode of the diode 8b are connected to the electrically conductive strip 6a, whereas the anode of the diode 8b and the cathode of the diode 8a are connected to the electrically conductive strip 6b.

When the strips 6a and 6b are connected to an electric current source, the diodes 8a and 8b lets the current through alternately, in phase the electric current source.

Figure 3:
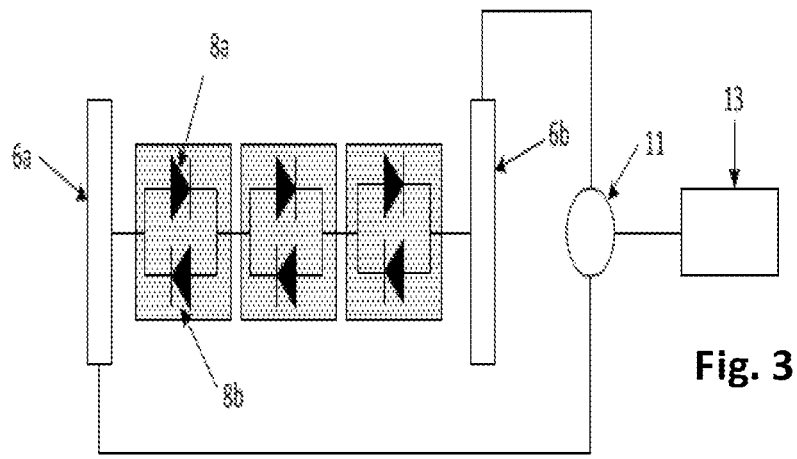
FIG. 3 shows a detail of another glazing according to the invention.

In the glazing of FIG. 3, the glazing comprises 3 LEDs arranged in series. According to the invention, each LED has diodes 8a and 8b arranged head-to-tail. When the strips 6a and 6b are connected to an electric current source, the diodes 8a and the diodes 8b let the current through alternately, in phase with the electric current source.

The following two examples show the advances provided by the invention.

In each of the two examples, laminated glazing was used that was obtained by proceeding as follows:
- on a glass sheet 2.1 mm thick, an electrically conductive layer based on fluorine-doped tin oxide, 300 nm thick and approximately 2 Ω/square, has been deposited;
- using a laser ray, two distinct electrically conductive zones, separated by a non-conductive groove, have been delimited in the electrically conductive layer;
- either side of the non-conductive groove, a sufficient number of light-emitting diodes (LED) has been glued to obtain the desired light effect, the anode of each LED being in contact with one of the two abovementioned conductive zones and the cathode of each LED being in contact with the other conductive zone;
- on the duly obtained assembly, three sheets of clear PVB totaling a thickness of 1.14 mm have been placed, followed by a sheet of clear glass 2.1 mm thick.

The duly formed assembly was autoclaved for a 120-minute cycle including at least 35 minutes at high temperature and pressure (125° C. and 8 bar).

In this embodiment, the LEDs are arranged in series. This embodiment has the advantage of providing a single connection circuit that is totally invisible even using two sheets of clear glass.

EXAMPLE 1 (NOT ACCORDING TO THE INVENTION)

In this example, the abovementioned two electrically conductive zones were respectively connected to the two terminals of a direct current source, so that the anodes of the LEDs are linked to the positive terminal of the current source, the cathodes being linked to the negative terminal of said current source.

The glazing was subjected to an ageing test in the following conditions:
electric current in the LEDs: 25 mA;
ambient temperature: 85° C.;
test duration: 72 hours.

On completion of the test, a brown coloration was observed in the conductive zone of the glazing, connected to the negative terminal of the direct current source. This coloration took the form of a brownish line along the non-conductive groove, in the vicinity of the LEDs and in the form of a brownish half-ring a few millimeters from the LEDs.

EXAMPLE 2 (ACCORDING TO THE INVENTION)

The test of example 1 was repeated using an electric current source controlled by a microcontroller.

On completion of the ageing test, no brown coloration was recorded in the glazing.

The invention claimed is:

1. A method for supplying electrical power to an electronic component of laminated glazing, the laminated glazing including at least two superposed sheets of glass with at least one thermoplastic interlayer inserted between them and the electronic component being housed between the two glass sheets, the method comprising:
   linking the electronic component to a source of electric current by an electrically conductive circuit, which is housed between the glass sheets; and
   controlling the source of electric current timewise by a microcontroller.

2. The method as claimed in claim 1, wherein the electrically conductive circuit includes at least a metal oxide and the thermoplastic interlayer includes metallic ions.

3. The method as claimed in claim 2, wherein the metallic ions of the thermoplastic interlayer comprise ions of alkaline metals and/or alkaline earth metals.

4. The method as claimed in claim 3, wherein the metallic ions of the thermoplastic interlayer comprise sodium ions and/or potassium ions and/or lithium ions and/or magnesium ions and/or calcium ions.

5. The method as claimed in claim 2, wherein the metal oxide of the electrically conductive circuit comprises tin dioxide.

6. The method as claimed in claim 5, wherein the tin dioxide is made electrically conductive by doping with fluorine and/or antimony.

7. The method as claimed in claim 5, wherein the electrically conductive circuit comprises an electrically conductive mixture of tin and indium oxides.

8. The method as claimed in claim 5, wherein the electrically conductive circuit comprises a stack of layers, at least one layer of which is electrically conductive.

9. The method as claimed in claim 8, wherein the electrically conductive layer of the electrically conductive circuit is a layer of electrically conductive metal.

10. The method as claimed in claim 9, wherein the electrically conductive circuit comprises a stack of layers $TiO_2/ZnO/Ag/Ti/ZnO/SnO_2$.

11. The method as claimed in claim 1, wherein the thermoplastic interlayer comprises a film of polyester.

12. The method as claimed in claim 11, wherein the polyester of the thermoplastic interlayer is selected from polyvinylbutyral, copolymers of ethylene and vinyl acetate and polyethylene-terephthalate.

13. The method as claimed in claim 1, wherein the electric current source has a maximum time of activation in a positive voltage mode of 32 h and in a negative voltage mode of 32 h.

14. The method as claimed in claim 1, wherein the electric current source has a maximum time of activation in the positive voltage mode of 12 h and in the negative voltage mode of 12 h.

15. The method as claimed in claim 1, wherein the source of electric current is an alternating current source.

16. The method as claimed in claim 15, wherein the alternating current source is of square wave type.

17. The method as claimed in claim 1, wherein the electronic component comprises an optoelectronic component.

18. The method as claimed in claim 17, wherein the optoelectronic component is selected from light-emitting diodes, photoresistors, photodiodes, and vision sensors.

19. The method as claimed in claim 1, wherein the electrically conductive circuit is obtained by inserting, between the thermoplastic interlayer and one of the glass sheets, an electrically conductive film that is segmented by strips that do not conduct electricity.

20. A laminated glazing for implementing the method as claimed in claim 1, comprising:
   two superposed glass sheets with a thermoplastic interlayer inserted between them; and
   an electronic component including a light-emitting diode and a protection diode that are housed between the glass sheets and that are connected to an electrically conductive circuit, also housed between the two glass sheets,
   wherein the two diodes are connected in parallel, in head-to-tail position, to the electrically conductive circuit.

\* \* \* \* \*